US011074027B2

(12) United States Patent
Ueda

(10) Patent No.: US 11,074,027 B2
(45) Date of Patent: Jul. 27, 2021

(54) DISPLAY APPARATUS AND SYSTEM WITH FIRST AND SECOND MODES

(71) Applicant: SEIKO EPSON CORPORATION, Tokyo (JP)

(72) Inventor: Yuki Ueda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/591,673

(22) Filed: Oct. 3, 2019

(65) Prior Publication Data

US 2020/0110567 A1    Apr. 9, 2020

(30) Foreign Application Priority Data

Oct. 4, 2018 (JP) .............................. JP2018-189274

(51) Int. Cl.
 *G06F 3/14* (2006.01)
 *H04N 9/31* (2006.01)

(52) U.S. Cl.
 CPC ......... *G06F 3/1446* (2013.01); *H04N 9/3147* (2013.01); *H04N 9/3188* (2013.01); *H04N 9/3197* (2013.01)

(58) Field of Classification Search
 CPC .. G06F 3/1446; H04N 9/3188; H04N 9/3147; H04N 9/3197; H04N 9/3179; G09G 2340/04; G09G 2340/12; G09G 2370/20; G09G 2340/10
 See application file for complete search history.

(56) References Cited

U.S. PATENT DOCUMENTS

| 2005/0007561 A1* | 1/2005 | Koyama | ................ H04N 21/47 353/94 |
| 2011/0234474 A1* | 9/2011 | Natori | ...................... H04N 5/04 345/1.3 |
| 2011/0234632 A1* | 9/2011 | Kubota | .................. G09G 5/397 345/634 |

(Continued)

FOREIGN PATENT DOCUMENTS

| JP | H08-032904 A | 2/1996 |
| JP | 2001-086428 A | 3/2001 |

(Continued)

*Primary Examiner* — Rodney Amadiz
(74) *Attorney, Agent, or Firm* — Dority & Manning, P.A.

(57) ABSTRACT

A display apparatus having a first mode and a second mode includes a first input section that receives first image information, a first image processor that performs image processing on the first image information to generate second image information in the first mode, a second input section that receives third image information, a second image processor that performs image processing on the second image information to generate fourth image information in the first mode and performs image processing on the third image information to generate fifth image information in the second mode, a display section that displays an image based on the fourth image information on a display surface in the first mode and displays an image based on the fifth image information on the display surface in the second mode, and an output section that outputs the second image information to another display apparatus in the first mode and outputs the third image information to the other display apparatus in the second mode.

15 Claims, 8 Drawing Sheets

(56) References Cited

U.S. PATENT DOCUMENTS

| | | | |
|---|---|---|---|
| 2011/0292080 A1* | 12/2011 | Oka | H04N 9/3197 |
| | | | 345/634 |
| 2012/0030595 A1 | 2/2012 | Itahana et al. | |
| 2013/0009998 A1* | 1/2013 | Hsieh | G06F 3/1438 |
| | | | 345/667 |
| 2013/0141475 A1 | 6/2013 | Kotani | |
| 2016/0139869 A1* | 5/2016 | Ito | G09G 3/001 |
| | | | 345/1.3 |
| 2017/0127030 A1* | 5/2017 | Chida | H04N 9/3155 |
| 2018/0270448 A1* | 9/2018 | Onuma | H04N 5/23216 |
| 2019/0037181 A1* | 1/2019 | Suzuki | G02F 1/1347 |

FOREIGN PATENT DOCUMENTS

| | | |
|---|---|---|
| JP | 2003-280624 A | 10/2003 |
| JP | 2011-244356 A | 12/2011 |
| JP | 2012-032935 A | 2/2012 |
| JP | 2013-117631 A | 6/2013 |

* cited by examiner

FIG. 3

| FIRST IMAGE INFORMATION | COMBINED IMAGE INFORMATION GENERATED BY COMBINING FIRST SUPPLIED IMAGE INFORMATION TO FOURTH SUPPLIED IMAGE INFORMATION WITH ONE ANOTHER |
|---|---|
| SECOND IMAGE INFORMATION | OUTPUT IMAGE INFORMATION GENERATED BY PERFORMING IMAGE PROCESSING ON COMBINED IMAGE INFORMATION |
| THIRD IMAGE INFORMATION | OUTPUT IMAGE INFORMATION RECEIVED BY SECOND INPUT SECTION |
| FOURTH IMAGE INFORMATION | DISPLAYED IMAGE INFORMATION GENERATED IN MASTER MODE |
| FIFTH IMAGE INFORMATION | DISPLAYED IMAGE INFORMATION GENERATED IN SLAVE MODE |

FIG. 4

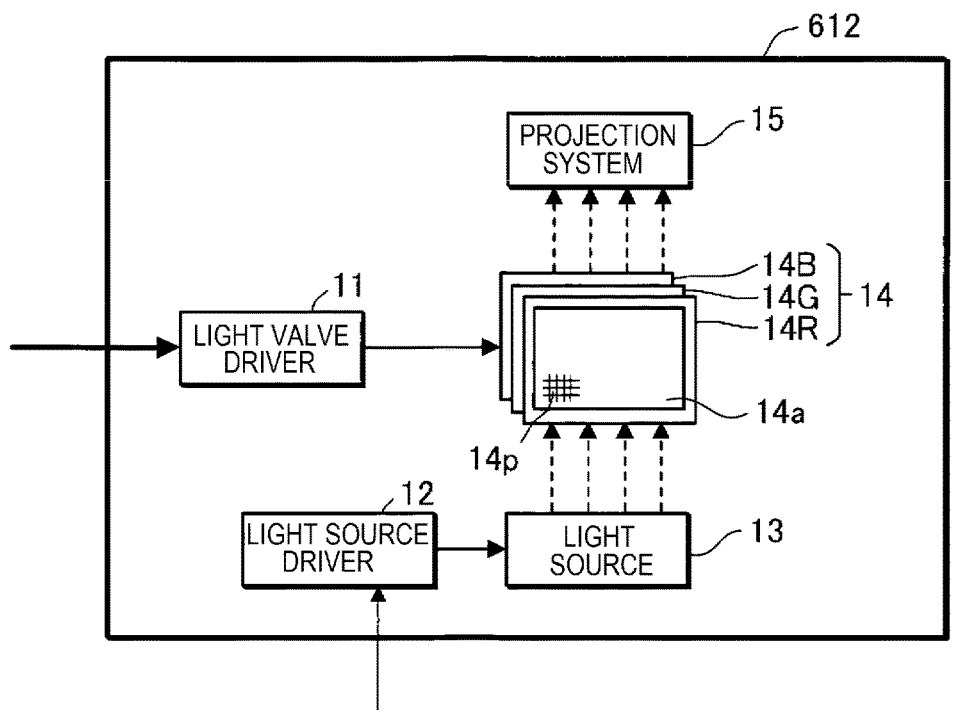

DISPLAY APPARATUS AND SYSTEM WITH FIRST AND SECOND MODES

The present application is based on, and claims priority from JP Application Serial Number 2018-189274, filed Oct. 4, 2018, the disclosure of which is hereby incorporated by reference herein in its entirety.

BACKGROUND

1. Technical Field

The present disclosure relates to a display apparatus, a display system, a method for controlling the display apparatus, and a method for controlling the display system.

2. Related Art

JP-A-2001-86428 describes a multi-screen display apparatus that links projection images projected by a plurality of projectors to each other to display a tiled image. In the multi-screen display apparatus, the plurality of projectors are connected in series to each other via cables, and image information is supplied to the projector at the head of the plurality of projectors. The head projector divides the image information into two pieces of image information, uses one of the two pieces of information for projection, and supplies the downstream projector with the other piece of information. The downstream projector acts in the same manner in which the head projector acts.

In a multi-projection system, such as the multi-screen display apparatus described in JP-A-2001-86428, the image information received by the head projector is directly supplied to the downstream projector. Therefore, for example, when image processing needs to be performed on the entire image represented by the image information, such as a change in the image quality of the entire image, it is necessary for the plurality of projectors to individually perform the image processing, causing a problem of usability of the multi-projection system.

SUMMARY

A display apparatus according to an aspect of the present disclosure is a display apparatus having a first mode and a second mode, the display apparatus including a first input section that receives first image information, a first image processor that performs image processing on the first image information to generate second image information in the first mode, a second input section that receives third image information, a second image processor that performs image processing on the second image information to generate fourth image information in the first mode and performs image processing on the third image information to generate fifth image information in the second mode, a display section that displays an image based on the fourth image information on a display surface in the first mode and displays an image based on the fifth image information on the display surface in the second mode, and an output section that outputs the second image information to another display apparatus in the first mode and outputs the third image information to the other display apparatus in the second mode.

A display system according to another aspect of the present disclosure includes a first display apparatus and a second display apparatus. The first display apparatus includes a first input section that receives image information, an output image information generator that performs image processing on the image information to generate output image information, a first displayed image information generator that performs image processing on the output image information to generate first displayed image information, a first display section that displays an image based on the first displayed image information on a display surface, and an output section that outputs the output image information to the second display apparatus. The second display apparatus includes a second input section that receives the output image information from the first display apparatus, a second displayed image information generator that performs image processing on the output image information to generate second displayed image information, and a second display section that displays an image based on the second displayed image information on the display surface.

A method for controlling a display apparatus according to another aspect of the present disclosure is a method for controlling a display apparatus having a first mode and a second mode, the method including receiving first image information, performing image processing on the first image information to generate second image information, performing image processing on the second image information to generate fourth image information, displaying an image based on the fourth image information on a display surface, and outputting the second image information to another display apparatus in the first mode, and receiving third image information, performing image processing on the third image information to generate fifth image information, displaying an image based on the fifth image information on the display surface, and outputting the third image information to the other display apparatus in the second mode.

BRIEF DESCRIPTION OF THE DRAWINGS

FIG. 3 shows examples of first image information to fifth image information.
FIG. 4 shows an example of a projection section.

DESCRIPTION OF EXEMPLARY EMBODIMENTS

A: First Embodiment

A1: Overview of Multi-Projection System 1

Figure 1:
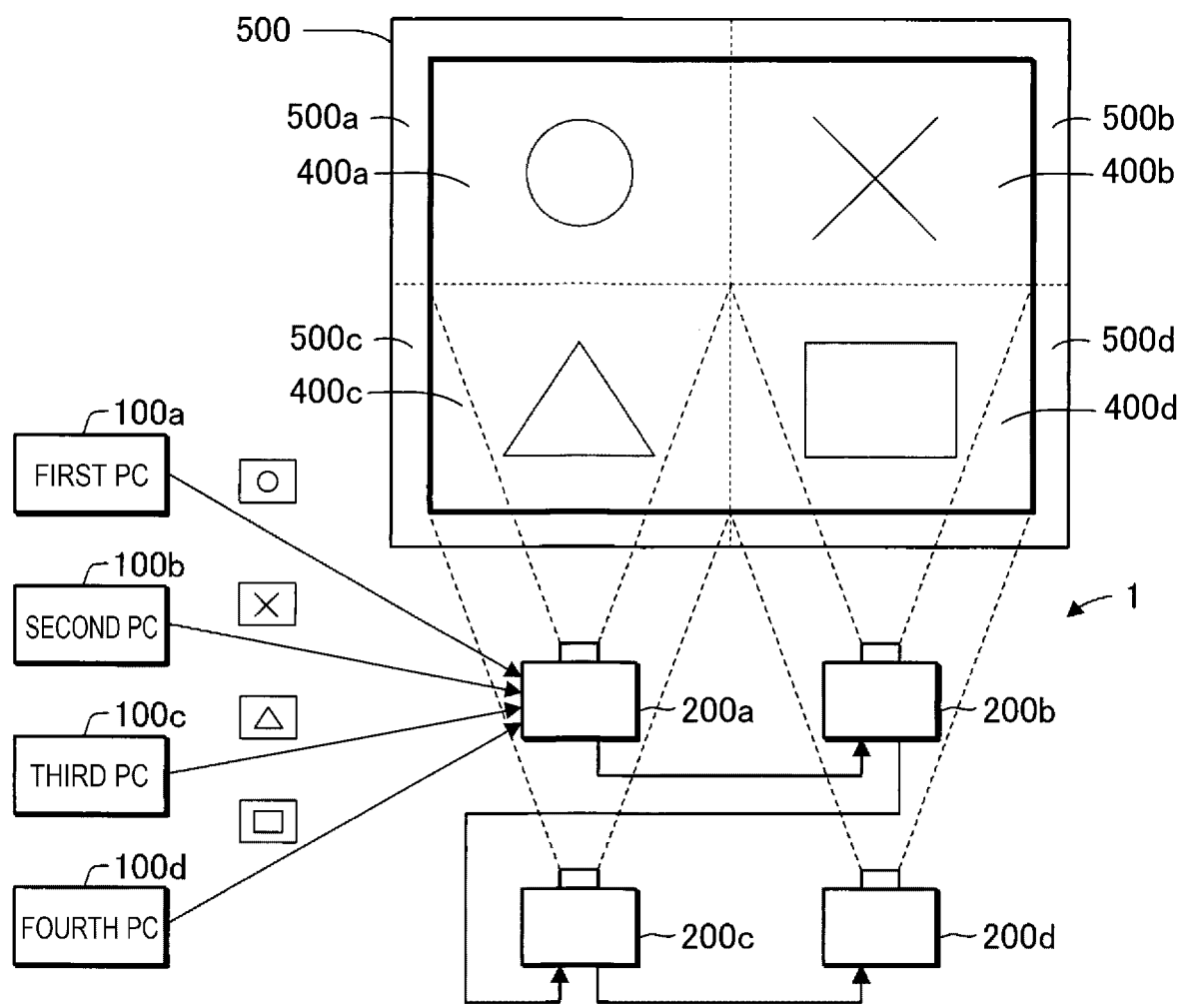
FIG. 1 shows an example of a multi-projection system.

FIG. 1 shows an example of a multi-projection system according to a first embodiment. The multi-projection system 1 is an example of a display system.

The multi-projection system 1 includes a first projector 200a, a second projector 200b, a third projector 200c, and a fourth projector 200d. The first projector 200a is an example of a first display apparatus. The second projector 200b is an example of a second display apparatus and other display apparatuses. The first projector 200a is connected to a first personal computer (PC) 100a, a second PC 100b, a third PC 100c, and a fourth PC 100d.

In the following description, when the first PC 100a, the second PC 100b, the third PC 100c, and the fourth PC 100d do not need to be distinguished from one another, the PCs are referred to as "PCs 100." The number of PCs 100 is not limited to four and may be at least one.

Further, when the first projector 200a, the second projector 200b, the third projector 200c, and the fourth projector 200d do not need to be distinguished from one another, the projectors are referred to as "projectors 200." The number of projectors 200 is not limited to four and may be at least two.

The PCs 100 are an example of an image supplying apparatus. The image supplying apparatus is typically also referred to as a source instrument in some cases. The image supplying apparatus is not limited to the PCs 100. For example, a DVD (digital versatile disc) player may be used as the image supplying apparatus.

The PCs 100 each supply the first projector 200a with image information representing an image, for example, via an HDMI (high definition multimedia interface) cable or a LAN (local area network). HDMI is a registered trademark. The aspect of the connection between each of the PCs 100 and the first projector 200a is not limited to an HDMI cable or a LAN and can be changed as appropriate.

The pieces of image information supplied by the first PC 100a, the second PC 100b, the third PC 100c, and the fourth PC 100d are hereinafter referred to as first supplied image information, second supplied image information, third supplied image information, and fourth supplied image information, respectively.

The first projector 200a, the second projector 200b, the third projector 200c, and the fourth projector 200d are connected in series to each other in the presented order, for example, via cables. The cables comply, for example, with the HDMI 2.0 standard. The cables may instead comply with a standard different from the HDMI 2.0 standard.

The first projector 200a uses the first supplied image information, the second supplied image information, the third supplied image information, and the fourth supplied image information to generate output image information. The output image information is provided to the second projector 200b, the third projector 200c, and the fourth projector 200d.

The first projector 200a uses the output image information to project a first projection image 400a onto a first region 500a. The second projector 200b uses the output image information to project a second projection image 400b onto a second region 500b. The third projector 200c uses the output image information to project a third projection image 400c onto a third region 500c. The fourth projector 200d uses the output image information to project a fourth projection image 400d onto a fourth region 500d.

In a case where a projection surface 500 is divided into upper, lower, right, and left projection surfaces, the first region 500a is the upper left portion of the projection surface 500, as shown in FIG. 1 by way of example. The second region 500b is the upper right portion of the projection surface 500. The third region 500c is the lower left portion of the projection surface 500. The fourth region 500d is the lower right portion of the projection surface 500. The projection surface 500 is, for example, a screen or a wall and an example of a display surface. The projection surface 500 is not limited to a screen or a wall and can be changed as appropriate.

The relative positional relationship among the first region 500a, the second region 500b, the third region 500c, and the fourth region 500d is not limited to the positional relationship shown in FIG. 1 and can be changed as appropriate. For example, the first region 500a, the second region 500b, the third region 500c, and the fourth region 500d may partially overlap with each other. In the following description, it is assumed that the first region 500a, the second region 500b, the third region 500c, and the fourth region 500d partially overlap with each other.

A2: Example of Configuration of Projectors 200

Figure 2:
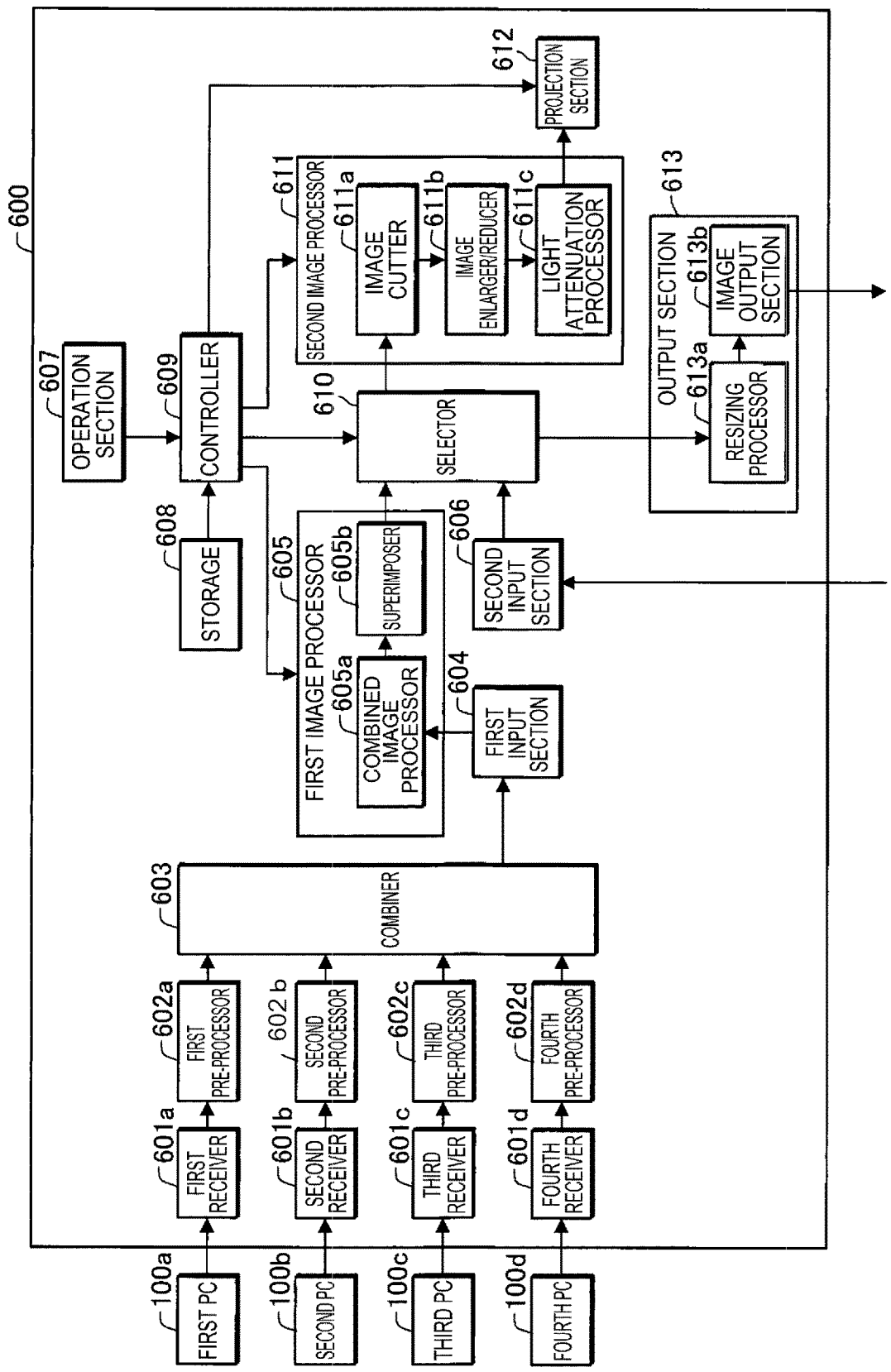
FIG. 2 shows an example of a base projector.

FIG. 2 shows an example of a base projector 600, which can be used as each of the first projector 200a, the second projector 200b, the third projector 200c, and the fourth projector 200d.

The base projector 600 has a master mode and a slave mode as the action mode. The master mode is an example of a first mode. The slave mode is an example of a second mode.

A description will be made of a case where the multi-projection system 1 is formed of four base projectors 600. Specifically, the first projector 200a is formed of the base projector 600 that acts in the master mode. The second projector 200b, the third projector 200c, and the fourth projector 200d are each formed of the base projector 600 that acts in the slave mode.

The base projector 600 includes a first receiver 601a, a second receiver 601b, a third receiver 601c, a fourth receiver 601d, a first pre-processor 602a, a second pre-processor 602b, a third pre-processor 602c, a fourth pre-processor 602d, a combiner 603, a first input section 604, a first image processor 605, and a second input section 606. The base projector 600 further includes an operation section 607, a storage 608, a controller 609, a selector 610, a second image processor 611, a projection section 612, and an output section 613.

The first receiver 601a, the second receiver 601b, the third receiver 601c, and the fourth receiver 601d receive the first supplied image information, the second supplied image information, the third supplied image information, and the fourth supplied image information, respectively.

In the following description, when the first receiver 601a, the second receiver 601b, the third receiver 601c, and the fourth receiver 601d do not need to be distinguished from one another, the receivers are referred to as "receivers 601." The number of receivers 601 is not limited to four and may be at least two. In a case where the combiner 603 is omitted, the number of receivers 601 may be one. In this case, the single receiver 601 may also serve as the first input section 604.

The first pre-processor 602a, the second pre-processor 602b, the third pre-processor 602c, and the fourth pre-processor 602d perform image processing on the first supplied image information, the second supplied image information, the third supplied image information, and the fourth supplied image information, respectively.

In the following description, when the first pre-processor 602a, the second pre-processor 602b, the third pre-processor 602c, and the fourth pre-processor 602d do not need to be distinguished from one another, the pre-processors are referred to as "pre-processors 602." The number of pre-processors 602 is not limited to four and may be at least two.

In a case where the combiner 603 is omitted, the pre-processors 602 may be omitted.

The combiner 603 combines the first supplied image information, the second supplied image information, the third supplied image information, and the fourth supplied image information with one another to generate combined image information representing a combined image. The combined image information is an example of first image information. The combined image is an example of a first image.

In the combined image, the first supplied image represented by the first supplied image information, the second supplied image represented by the second supplied image information, the third supplied image represented by the third supplied image information, and the fourth supplied image represented by the fourth supplied image information are linked to each other. In the present embodiment, the first supplied image is located in the upper left position, the second supplied image is located in the upper right position, the third supplied image is located in the lower left position, and the fourth supplied image is located in the lower right position in the combined image. The combiner 603 may be omitted.

The first input section 604 receives the combined image information. The first input section 604 may instead receive the combined image information, for example, from an external instrument instead of the combiner 603. The first input section 604 is, for example, an input terminal or a wiring line.

The first image processor 605 performs image processing on the combined image information to generate the output image information. The first image processor 605 is an example of an output image information generator. The output image information is an example of second image information. The first image processor 605 includes a combined image processor 605a and a superimposer 605b.

The combined image processor 605a performs image processing on the combined image information. The combined image processor 605a uses as the image processing, for example, image quality correction that corrects the image quality of the combined image represented by the combined image information.

The superimposer 605b generates, as the output image information, superimposed image information representing a superimposed image in which a menu image is superimposed on the combined image. The menu image is an image that allows the combined image processor 605a to perform the image quality correction and is an example of an operation image used to correct the image quality of the combined image.

In a case where it is not necessary to display the menu image, the superimposer 605b may generate no superimposed image but output the combined image information generated by the combined image processor 605a as the output image information.

The first receiver 601a to the fourth receiver 601d, the first pre-processors 602a to the fourth pre-processors 602d, the combiner 603, the first input section 604, and the first image processor 605 function primarily in the master mode.

The second input section 606 directly or indirectly receives the output image information generated by the first projector 200a that acts in the master mode. The output image information received by the second input section 606 is an example of third image information.

The second input section 606 functions primarily in the slave mode.

The operation section 607 is, for example, a variety of operation buttons, a variety of operation keys, or a touch panel. The operation section 607 receives a user's input operation. For example, the operation section 607 receives image quality correction operation inputted by the user in accordance with the menu image. The image quality correction operation is an example of operation for correcting the image quality of the combined image.

The storage 608 is a computer readable recording medium. The storage 608 stores a program that specifies the action of the base projector 600 and a variety of pieces of information. As the variety of pieces of information, the storage 608 stores cut position information representing a position where displayed image information to be cut from the output image information is cut. The cut position information is inputted, for example, by the user.

The controller 609 is a computer, such as a CPU (central processing unit). The controller 609 may be formed of one or more processors. The controller 609 reads and executes the program stored in the storage 608 to control the base projector 600. For example, the controller 609 manages the action mode of the base projector 600.

In a case where the action mode managed by the controller 609 is the master mode, the selector 610 distributes the output image information generated by the first image processor 605 to the second image processor 611 and the output section 613. In the case where the action mode is the slave mode, the selector 610 distributes the output image information received by the second input section 606 to the second image processor 611 and the output section 613.

The second image processor 611 performs image processing on the output image information provided from the selector 610 to generate the displayed image information. The second image processor 611 of the base projector 600 that acts in the master mode is an example of a first displayed image information generator. The second image processor 611 of the base projector 600 that acts in the slave mode is an example of a second displayed image information generator. The displayed image information generated in the master mode is an example of each of fourth image information and first displayed image information. The displayed image information generated in the slave mode is an example of each of fifth image information and second displayed image information.

The second image processor 611 includes an image cutter 611a, an image enlarger/reducer 611b, and a light attenuation processor 611c.

The image cutter 611a cuts the displayed image information from the output image information based on the cut position information stored in the storage 608. The displayed image information is therefore part of the output image information. The controller 609 provides the image cutter 611a with the cut position information from the storage 608.

The image enlarger/reducer 611b changes the size of an image represented by the displayed image information.

The light attenuation processor 611c performs edge blending on the displayed image information having undergone the change in size. The edge blending is the process of causing an inter-image seam to be less visible. In the edge blending, light attenuation is performed on a superimposed region where part of one of a plurality of images is superimposed on part of another of the plurality of images in the projection surface 500 to cause a difference in illuminance between the superimposed region and the non-superimposed region to be less visible.

The projection section 612 projects an image based on the displayed image information on the projection surface 500.

The projection section 612 is an example of a display section. The projection section 612 of the base projector 600 that acts in the master mode is an example of a first display section. The projection section 612 of the base projector 600 that acts in the slave mode is an example of a second display section.

The output section 613 outputs the output image information provided from the selector 610 to the downstream projector 200. The output section 613 includes a resizing processor 613a and an image output section 613b.

The resizing processor 613a changes the size of the image represented by the output image information.

The image output section 613b outputs the output image information having undergone the change in size to the downstream projector 200.

FIG. 3 summarizes examples of the first image information to the fifth image information in the present embodiment.

A3: Example of Configuration of Projection Section 612

FIG. 4 shows an example of the projection section 612. The projection section 612 includes a light valve driver 11, a light source driver 12, a light source 13, a red liquid crystal light valve 14R, a green liquid crystal light valve 14G, a blue liquid crystal light valve 14B, and a projection system 15. In the following description, when the red liquid crystal light valve 14R, the green liquid crystal light valve 14G, and the blue liquid crystal light valve 14B do not need to be distinguished from one another, the liquid crystal light valves are referred to as "liquid crystal light valves 14."

The light valve driver 11 drives the liquid crystal light valves 14 based on the displayed image information inputted from the light attenuation processor 611c. The light source driver 12 drives the light source 13 under the control of the controller 609.

The light source 13 is, for example, a xenon lamp, an ultrahigh-pressure mercury lamp, an LED (light emitting diode), or a laser light source. The light outputted from the light source 13 passes through an optical integration system that is not shown, which reduces variation in luminance distribution of the light, and the resultant light is then separated by a color separation system that is not shown into color light components, a red light component, a green light component, and a blue light component, which are the three primary colors of light. The red light component is incident on the red liquid crystal light valve 14R. The green light component is incident on the green liquid crystal light valve 14G. The blue light component is incident on the blue liquid crystal light valve 14B.

The liquid crystal light valves 14 are each formed, for example, of a liquid crystal panel in which a liquid crystal material is present between a pair of transparent substrates. The liquid crystal light valves 14 each have a rectangular pixel region 14a containing a plurality of pixels 14p arranged in a matrix. In each of the liquid crystal light valves 14, drive voltage is applied to the liquid crystal material at each of the pixels 14p. When the light valve driver 11 applies drive voltage based on the displayed image information inputted from the light attenuation processor 611c to each of the pixels 14p, the pixel 14p has light transmittance set based on the drive voltage. The light outputted from the light source 13 is therefore modulated when passing through the pixel region 14a, and an image based on the displayed image information is formed on a color light basis.

A light combining system that is not shown combines the color images with one another for each of the pixels 14p to produce a color projection image. The projection image is projected via the projection system 15 on the projection surface 500.

A4: Action Mode Setting

Figure 5:
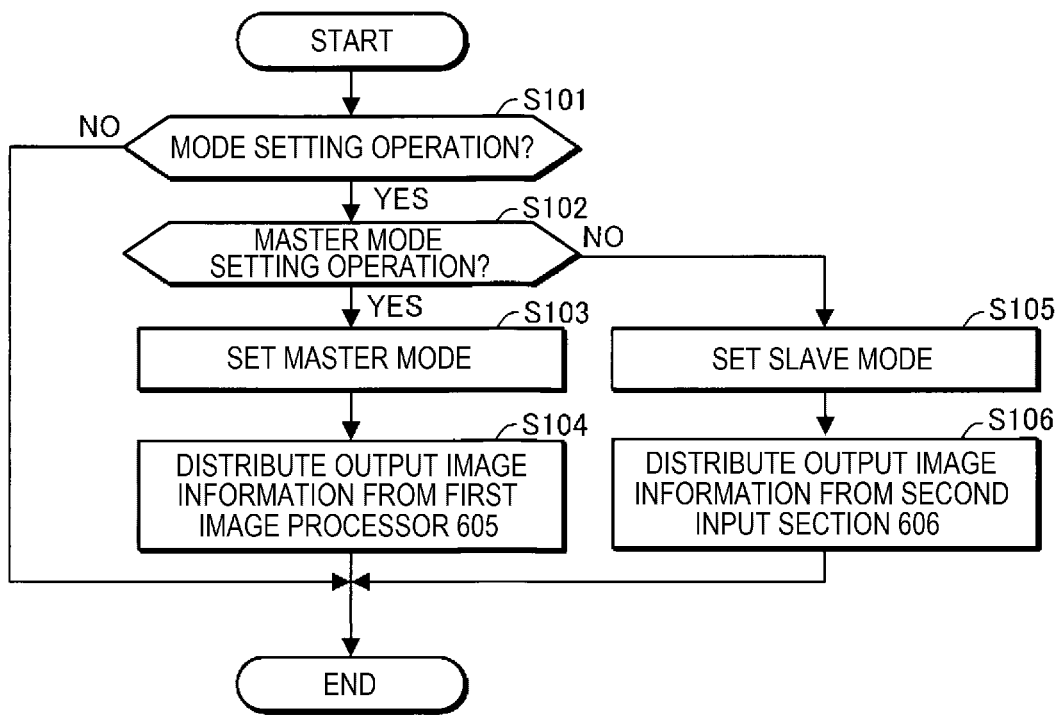
FIG. 5 is a flowchart for describing the action of setting an action mode.

FIG. 5 is a flowchart for describing the action of setting the action mode of the base projector 600.

When the operation section 607 receives mode setting operation in step S101, the controller 609 evaluates in step S102 whether or not the mode setting operation is master mode setting operation.

In a case where the mode setting operation is the master mode setting operation in step S102, the controller 609 sets the master mode as the action mode in step S103.

Having set the master mode as the action mode, the controller 609 causes the selector 610 to distribute the output image information outputted from the first image processor 605 to the second image processor 611 and the output section 613 in step S104.

On the other hand, when the mode setting operation is slave mode setting operation in step S102, the controller 609 sets the slave mode as the action mode in step S105.

Having set the slave mode as the action mode, the controller 609 causes the selector 610 to distribute the output image information received by the second input section 606 to the second image processor 611 and the output section 613 in step S106.

A5: Action of Base Projector 600 that Acts in Master Mode

Figure 6:
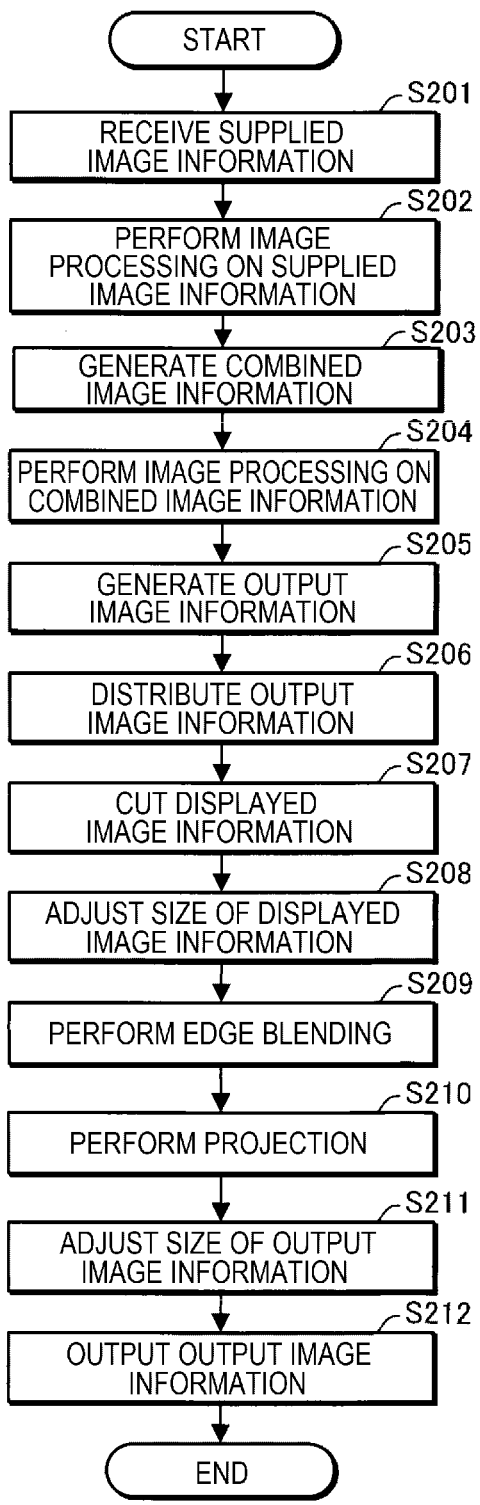
FIG. 6 is a flowchart for describing the action of the base projector that acts in a master mode.

FIG. 6 is a flowchart for describing the action of the base projector 600 that acts in the master mode, that is, the action of the first projector 200a.

In step S201, the first receiver 601a, the second receiver 601b, the third receiver 601c, and the fourth receiver 601d receive the first supplied image information, the second supplied image information, the third supplied image information, and the fourth supplied image information, respectively.

Subsequently, in step S202, the first pre-processor 602a, the second pre-processor 602b, the third pre-processor 602c, and the fourth pre-processor 602d perform image processing on the first supplied image information, the second supplied image information, the third supplied image information, and the fourth supplied image information, respectively, as required.

In step S202, when the format of the inputted supplied image information differs from a supplied image information format processable by the combiner 603, the first pre-processor 602a, the second pre-processor 602b, the third pre-processor 602c, and the fourth pre-processor 602d each change the format of the inputted supplied image information to the supplied image information format processable by the combiner 603. As an example, when the first supplied image information is expressed in the form of an analog signal under the circumstance in which the supplied image information format processable by the combiner 603 is a digital format, the first pre-processor 602a converts the first supplied image information into a digital signal.

Figure 7:
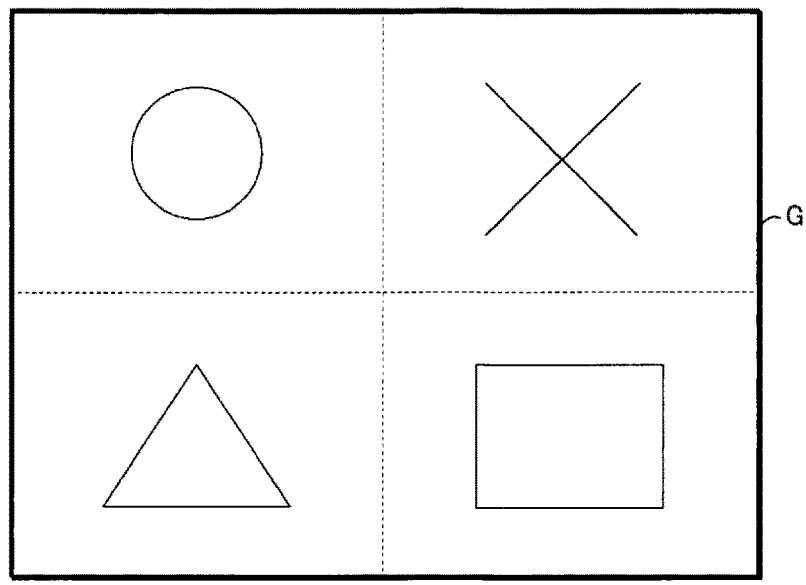
FIG. 7 shows an example of a combined image.

Subsequently, in step S203, the combiner 603 uses the first supplied image information, the second supplied image information, the third supplied image information, and the fourth supplied image information to generate the combined image information. For example, when the first supplied image information represents a "circle," the second supplied image information represents a "cross," the third supplied image information represents a "triangle," and the fourth supplied image information represents a "square," the combiner 603 generates combined image information representing a combined image G, in which the "circle" is located in the upper left position, the "cross" is located in the upper right position, the "triangle" is located in the lower left position, and the "square" is located in the lower right position, as shown in FIG. 7 by way of example. The combined image G is not limited to the image shown in FIG. 7 by way of example and can be changed as appropriate. The combined image information is provided to the combined image processor 605a via the first input section 604.

Subsequently, in step S204, the combined image processor 605a performs image processing, specifically, the image quality correction on the combined image information. Examples of the image quality correction may include a super-resolution process, a sharpness process, and a color adjustment process. The super-resolution process is the process of increasing the resolution of the combined image G. The sharpness process is the process of increasing the difference in luminance between a pixel and a pixel adjacent thereto in the combined image G. The color adjustment process is the process of adjusting the color of the combined image G. The image quality correction is not limited to the super-resolution process, the sharpness process, or the color adjustment process and may be any process of correcting the image quality of the combined image G.

The combined image processor 605a performs the image quality correction in response, for example, to the image quality correction operation inputted by the user via the operation section 607 in accordance with the menu image projected in step S210, which will be described later. In a case where the operation section 607 receives no image quality correction operation, the combined image processor 605a performs no image quality correction on the combined image information but outputs the combined image information having undergone no image quality correction.

Subsequently, in step S205, the superimposer 605b generates, as the output image information, the superimposed image information representing the superimposed image in which the menu image is superimposed on the combined image G.

Figure 8:
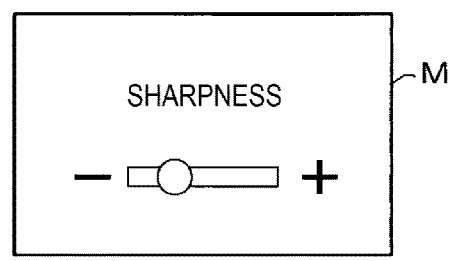
FIG. 8 shows an example of a menu image.

The menu image is, for example, a menu image M shown in FIG. 8 by way of example. The menu image M shown in FIG. 8 shows the sharpness process as the image quality correction. The menu image M is not limited to the image shown in FIG. 8 by way of example.

Figure 9:
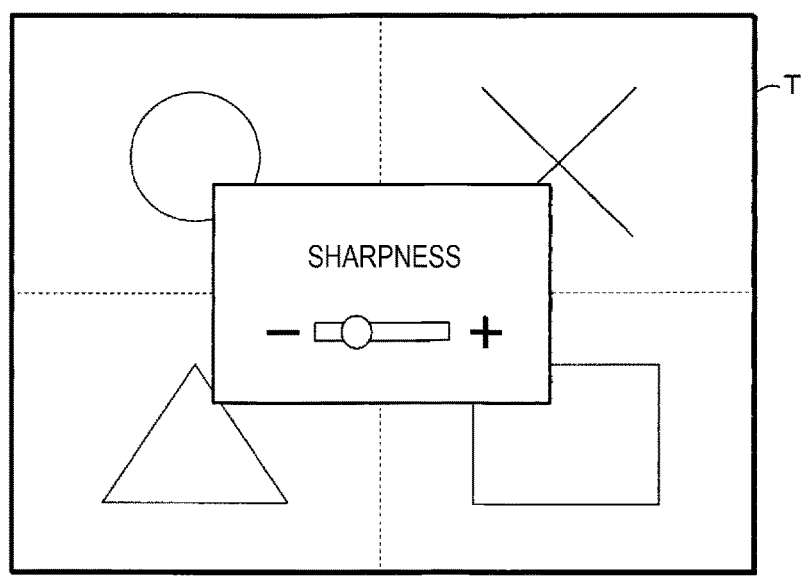
FIG. 9 shows an example of a superimposed image.

In the case where the menu image M shown in FIG. 8 is used as the menu image M, the superimposed image is, for example, a superimposed image T shown in FIG. 9 byway of example. In the superimposed image T shown in FIG. 9, the menu image M shown in FIG. 8 is superimposed on the combined image G shown in FIG. 7.

Referring back to FIG. 6, since the action mode is the master mode, the selector 610 distributes the output image information outputted by the superimposer 605b to the second image processor 611 and the output section 613 in step S206.

Figure 10:
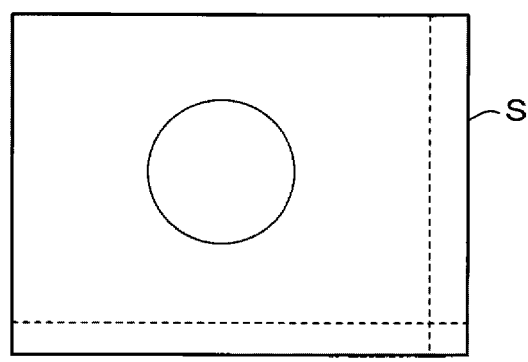
FIG. 10 shows an example of an image represented by displayed image information.

Subsequently, in step S207, the image cutter 611a cuts displayed image information from the output image information based on the cut position information. FIG. 10 shows an example of an image S represented by the displayed image information and cut by the first projector 200a that acts in the master mode.

Subsequently, in step S208, the image enlarger/reducer 611b changes the size of the displayed image information, that is, the resolution of the image S represented by the displayed image information to the resolution of the liquid crystal light valves 14 of the projection section 612.

Figure 11:
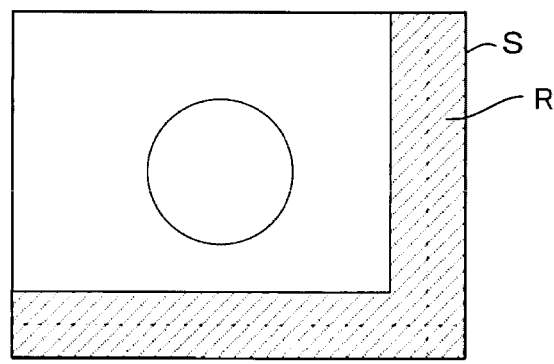
FIG. 11 shows an example of a region where edge blending causes light attenuation.

Subsequently, in step S209, the light attenuation processor 611c performs the edge blending on the displayed image information having undergone the change in size. FIG. 11 shows an example of a region R where the edge blending causes light attenuation. In FIG. 11, the region R is also a region on which another image is superimposed.

Subsequently, in step S210, the projection section 612 projects the image S based on the displayed image information and having undergone the edge blending on the first region 500a of the projection surface 500.

On the other hand, in the output section 613, the resizing processor 613a changes in step S211 the size of the output image information generated by the superimposer 605b, that is, the resolution of the superimposed image T represented by the output image information to resolution that the image output section 613a can handle. The resolution that the image output section 613a can handle is determined in advance by a standard that the image output section 613b handles, for example, the HDMI 2.0 standard. In other words, the resolution that the image output section 613a can handle is determined in advance by a standard that a cable connected to the image output section 613b handles. The resizing processor 613a outputs the output image information having undergone the change in resolution to the image output section 613b.

In the case where the resolution of the output image information falls within the range of resolution that the image output section 613b can handle, the resizing processor 613a outputs the output image information to the image output section 613b with the resolution of the output image information unchanged.

Subsequently, in step S212, the image output section 613b outputs the output image information received from the resizing processor 613a to the downstream projector 200.

The processes from steps S207 to S210 and the processes from steps S211 to S212 are desirably carried out in parallel.

A6: Action of Base Projector 600 that Acts in Slave Mode

Figure 12:
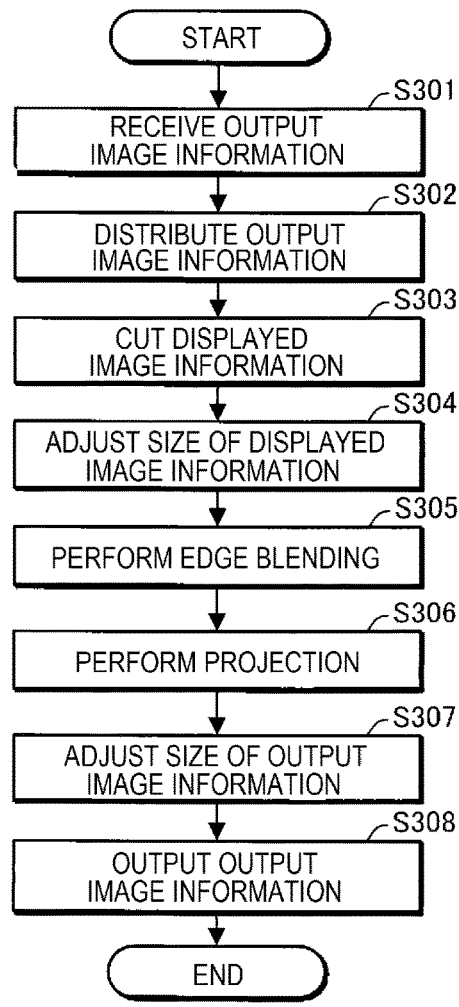
FIG. 12 is a flowchart for describing the action of the base projector that acts in a slave mode.

FIG. 12 is a flowchart for describing the action of the base projector 600 that acts in the slave mode, that is the action of each of the second projector 200b to the fourth projector 200d.

In step S301, the second input section 606 receives the output image information from the upstream projector 200.

Subsequently, since the action mode is the slave mode, the selector 610 distributes the output image information received by the second input section 606 to the second image processor 611 and the output section 613 in step S302.

Steps S303 to S308 are subsequently carried out. Steps S303 to S308 are the same as steps S207 to S212 shown in FIG. 6 except that the handled output image information is not the output image information outputted by the superimposer 605 but is output image information received by the second input section 606, that the displayed image information is cut in a different cut position, that the light attenuation is performed on the region R in a different position, and that the image is projected in a different position. Further, steps S303 to S308 are carried out based on a known technology. Step S308 is omitted when no downstream projector 200 is present.

In step S303, displayed image information is cut from the output image information having resolution adjusted by the upstream projector 200, and in the subsequent step S304, the resolution of the displayed image information is changed to the resolution of the liquid crystal light valves 14.

For example, when the resolution of the output image information generated by the first projector 200a has a size that the cable that connects the first projector 200a to the second projector 200b cannot handle, the first projector 200a reduces the resolution and outputs the output image information having the reduced resolution to the second projector 200*b*. The second projector 200*b* then cuts the displayed image information from the output image information and, for example, enlarges the resolution of the displayed image information in such a way that the enlarged resolution coincides with the resolution of the liquid crystal light valves 14.

The multi-projection system 1 can therefore display, on the projection surface 500, an image represented by the output image information having resolution that the cable that connects adjacent projectors 200 to each other cannot handle. For example, even when the projectors 200 can each display a 4K-resolution image but the cable that connects adjacent projectors 200 to each other cannot transfer the 4K-resolution output image information, the projectors 200 can each display a 4K-resolution image on the projection surface 500.

According to the base projector 600 and the method for controlling the base projector 600 according to the present embodiment, the base projector 600 that acts in the master mode, that is, the first projector 200*a* performs image processing on the combined image information to generate the output image information, displays an image based on part of the output image information, and outputs the output image information to the downstream projector 200.

Therefore, even in the multi-projection system 1 including a plurality of projectors 200, only one projector 200, that is, only the first projector 200*a* can change an entire combined image. In the present embodiment, in particular, the first projector 200*a* corrects the image quality of the combined image G in response to the image quality correction operation according to the menu image M and can therefore correct the image quality of the entire combined image G. The amount of effort of the correction can therefore be reduced as compared with a case where the projectors 200 each partially correct the image quality of the combined image G.

Further, since the output image information received by a downstream projector 200 has already undergone image processing, the downstream projector 200 does not need to perform the same image processing performed by the first projector 200*a*, for example, the image quality correction. The processing burden of processes on the downstream projector 200 can therefore be reduced.

Further, since the first projector 200*a* generates the superimposed image information representing the superimposed image T, on which the menu image M has been superimposed, the other projectors 200 each need to generate no superimposed image information. The processing burden of processes on the downstream projectors 200 can therefore be reduced.

Figure 13:
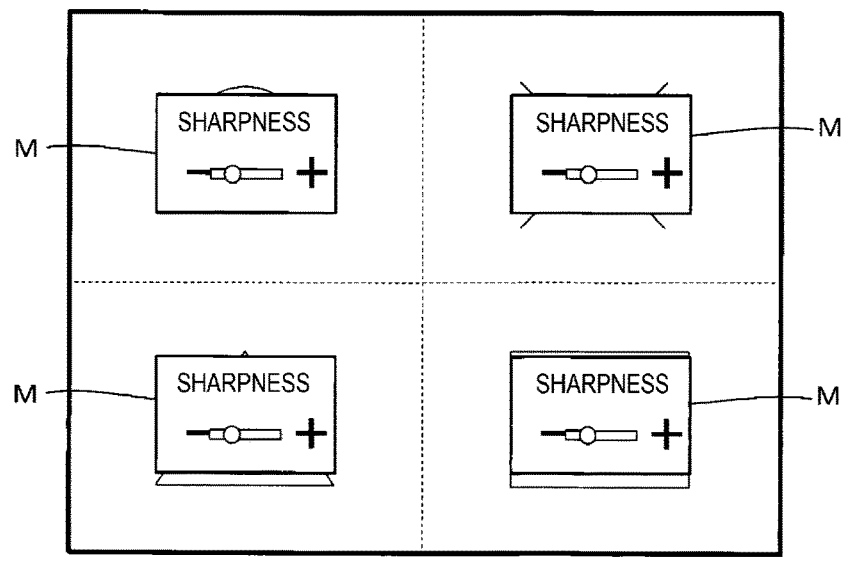
FIG. 13 shows an example in which menu images the number of which is equal to the number of projectors are displayed.

Further, for example, when the plurality of projectors 200 each display the menu image M on the projection surface 500, the menu images M the number of which is equal to the number of projectors 200 are displayed, as shown, for example, in FIG. 13, resulting in a problem of operability.

In contrast, in the present embodiment, one menu image M is displayed, as shown in FIG. 9 by way of example, whereby the operability of the menu image M is increased as compared with the configuration in which the menu images M the number of which is equal to the number of projectors 200 are displayed.

Further, when the superimposer 605*b* generates the superimposed image information in such a way that the position of the center of the menu image M coincides with the position of the center of the combined image G, the visibility of the menu image M can be improved. It is noted that the position of the center of the menu image M may not coincide with the position of the center of the combined image G.

Further, since the first projector 200*a* generates the combined image information, no apparatus that generates combined image information is required except the first projector 200*a*, whereby the multi-projection system 1 can display the combined image G on the projection surface 500 with no such apparatus.

Further, the base projector 600 can serve as any of the first projector 200*a* to the fourth projector 200*d* by switching the action mode from one to the other and therefore has high versatility.

B: Variations

The first embodiment may employ, for example, any of the following configurations shown by way of example.

B1: Variation 1

In the first embodiment, the pre-processors 602, the combiner 603, and the first image processor 605 may act in the master mode but may not act in the slave mode. As an example, the controller 609 does not supply the pre-processors 602, the combiner 603, or the first image processor 605 with power-source voltage from a power source supplier that is not shown in the slave mode but supplies the pre-processors 602, the combiner 603, and the first image processor 605 with the power-source voltage from the power source supplier in the master mode.

B2: Variation 2

In the first embodiment and Variation 1, the first supplied image, the second supplied image, the third supplied image, and the fourth supplied image may not have the same area or shape in the combined image G. For example, in the combined image G shown in FIG. 7, the first supplied image may be larger than the other supplied images. Further, the combined image may have a region where none of the first supplied image, the second supplied image, the third supplied image, and the fourth supplied image is present. The region is displayed, for example, in black.

Further, the size of the displayed image information cut from the output image information by each of the projectors 200 may not be equal to the size associated with the other projectors 200.

B3: Variation 3

In the first embodiment and Variations 1 to 2, for example, when the resolution that the image output section 613*b* can handle, that is, the resolution that the cable connected to the image output section 613*b* can handle is greater than or equal to a first threshold, the resizing processor 613*a* may be omitted.

B4: Variation 4

In the first embodiment and Variations 1 to 3, the operation section 607 may be a remote control. In this case, the user can use the remote control of the first projector 200*a* to perform the image quality correction operation according to the menu image.

B5: Variation 5

In the first embodiment and Variations 1 to 4, the projectors 200 may each automatically switch the action mode from one to the other. For example, the controller 609 sets the master mode as the action mode when the first input section 604 receives image information, specifically, the combined image information. On the other hand, the controller 609 sets the slave mode as the action mode when the second input section 606 receives image information, specifically, the combined image information.

B6: Variation 6

In the first embodiment and Variations 1 to 5, the edge blending may be omitted. In this case, the light attenuation processor 611c is desirably omitted.

B7: Variation 7

In the first embodiment and Variations 1 to 6, entirety or part of the pre-processors 602, the combiner 603, the first image processor 605, the controller 609, the selector 610, the second image processor 611, and the resizing processor 613a may be achieved by an electronic circuit, for example, an FPGA (field programmable gate array) or an ASIC (application specific IC).

B8: Variation 8

In the first embodiment and Variations 1 to 7, the liquid crystal light valves 14 are used as an example of a light modulator, and the light modulator is not necessarily formed of liquid crystal light valves and can be changed as appropriate. For example, the light modulator may instead be formed of three reflective liquid crystal panels. The light modulator may still instead, for example, be formed of one liquid crystal panel, three digital mirror devices (DMDs), or one digital mirror device. In the case where only one liquid crystal panel or DMD is used as the light modulator, no members corresponding to the color separation system and the light combining system are required. Further, a configuration including no liquid crystal panel or DMD but capable of modulating light emitted from the light source 13 can be employed as the light modulator.

B9: Variation 9

The display apparatus is not necessarily formed of the projectors 200 and may instead be formed of direct-view displays, such as liquid crystal displays.

What is claimed is:

1. A display apparatus having a first mode and a second mode, the display apparatus comprising:
   a first input section that receives first image information;
   a first image processor that performs image processing on the first image information to generate second image information in the first mode;
   a second input section that receives third image information;
   a second image processor that performs image processing on the second image information to generate fourth image information in the first mode and performs image processing on the third image information to generate fifth image information in the second mode;
   a display section that displays an image based on the fourth image information on a display surface in the first mode and displays an image based on the fifth image information on the display surface in the second mode; and
   an output section that outputs the second image information to another display apparatus in the first mode and outputs the third image information to the other display apparatus in the second mode.

2. The display apparatus according to claim 1,
   wherein the fourth image information is part of the second image information, and
   the fifth image information is part of the third image information.

3. The display apparatus according to claim 1,
   wherein the first image processor generates, as the second image information, superimposed image information representing a superimposed image in which an operation image for correcting image quality of a first image represented by the first image information is superimposed on the first image.

4. The display apparatus according to claim 3,
   further comprising an operation section that receives operation according to the operation image and for correcting the image quality,
   wherein when the operation section receives the operation, the first image processor performs image processing of correcting the image quality on the first image information to generate the second image information.

5. The display apparatus according to claim 4,
   wherein the operation section comprises a user-operated remote control.

6. The display apparatus according to claim 1,
   wherein the output section changes a size of the second image information and outputs the second image information having undergone the change in size to the other display apparatus in the first mode.

7. The display apparatus according to claim 1, further comprising:
   a first receiver that receives first supplied image information;
   a second receiver that receives second supplied image information; and
   a combiner that generates, as the first image information, combined image information that is a combination of the first supplied image information and the second supplied image information,
   wherein the first input section receives the first image information generated by the combiner.

8. A display system having a first mode and a second mode, the display, system comprising:
   a first display apparatus and a second display apparatus,
   wherein the first display apparatus includes
      a first input section that receives combined image information,
      an output image information generator having a combined image processor that performs image processing on the combined image information to generate output image information,
      a first displayed image information generator that in the first mode performs image processing on the output image information to generate first displayed image information,
      a first display section that displays an image based on the first displayed image information on a display surface, and
      an output section that outputs the output image information to the second display apparatus, and
   the second display apparatus includes
      a second input section that receives the output image information from the first display apparatus,
      a second displayed image information generator that in the second mode performs image processing on the output image information to generate second displayed image information, and
      a second display section that displays an image based on the second displayed image information on the display surface.

9. A method for controlling a display apparatus having a first mode and a second mode, the method comprising:
   receiving first image information, performing image processing on the first image information to generate second image information, performing image processing on the second image information to generate fourth image information, displaying an image based on the fourth image information on a display surface, and outputting the second image information to another display apparatus in the first mode; and receiving third image information, performing image processing on the third image information to generate fifth image information, displaying an image based on the fifth image information on the display surface, and outputting the third image information to the other display apparatus in the second mode.

10. The method for controlling a display apparatus according to claim 9,
    wherein the fourth image information is part of the second image information, and
    the fifth image information is part of the third image information.

11. The method for controlling a display apparatus according to claim 9,
    further comprising generating, as the second image information, superimposed image information representing a superimposed image in which an operation image for correcting image quality of a first image represented by the first image information is superimposed on the first image.

12. The method for controlling a display apparatus according to claim 11,
    further comprising receiving operation according to the operation image and for correcting the image quality, and
    upon the reception of the operation, performing image processing of correcting the image quality on the first image information to generate the second image information.

13. The method for controlling a display apparatus according to claim 12,
    wherein receiving operation comprises receiving input from a user-operated remote control.

14. The method for controlling a display apparatus according to claim 9,
    further comprising changing a size of the second image information and outputting the second image information having undergone the change in size to the other display apparatus in the first mode.

15. The method for controlling a display apparatus according to claim 9, further comprising:
    receiving first supplied image information;
    receiving second supplied image information;
    generating, as the first image information, combined image information that is a combination of the first supplied image information and the second supplied image information; and
    receiving the generated first image information.

\* \* \* \* \*